E. SCHNEIDER.
APPARATUS FOR PREVENTING THE ENTRANCE OF ENEMY PROJECTILES INTO THE MUZZLES OF GUNS DURING THE LOADING OPERATIONS.
APPLICATION FILED JUNE 24, 1919.

1,334,801.

Patented Mar. 23, 1920.
5 SHEETS—SHEET 1.

E. SCHNEIDER.
APPARATUS FOR PREVENTING THE ENTRANCE OF ENEMY PROJECTILES INTO THE MUZZLES
OF GUNS DURING THE LOADING OPERATIONS.
APPLICATION FILED JUNE 24, 1919.

1,334,801.

Patented Mar. 23, 1920.
5 SHEETS—SHEET 2.

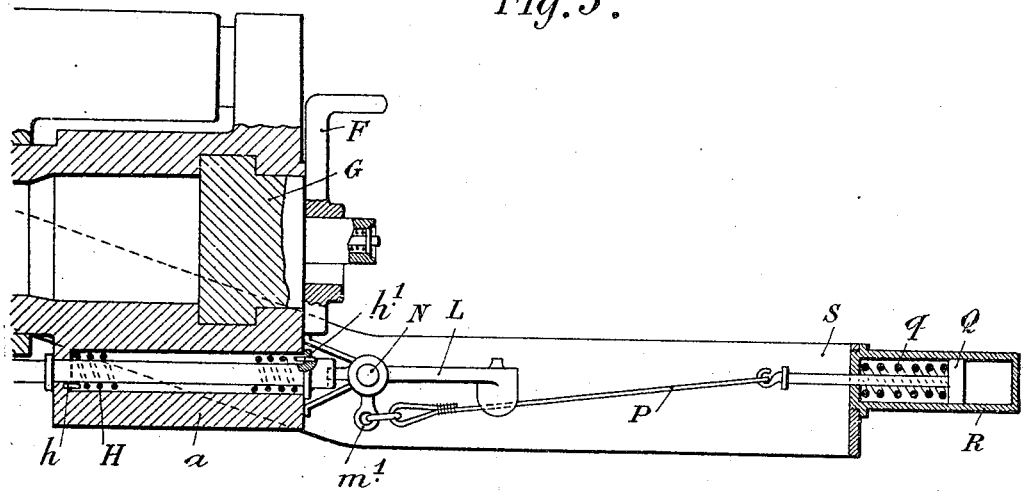
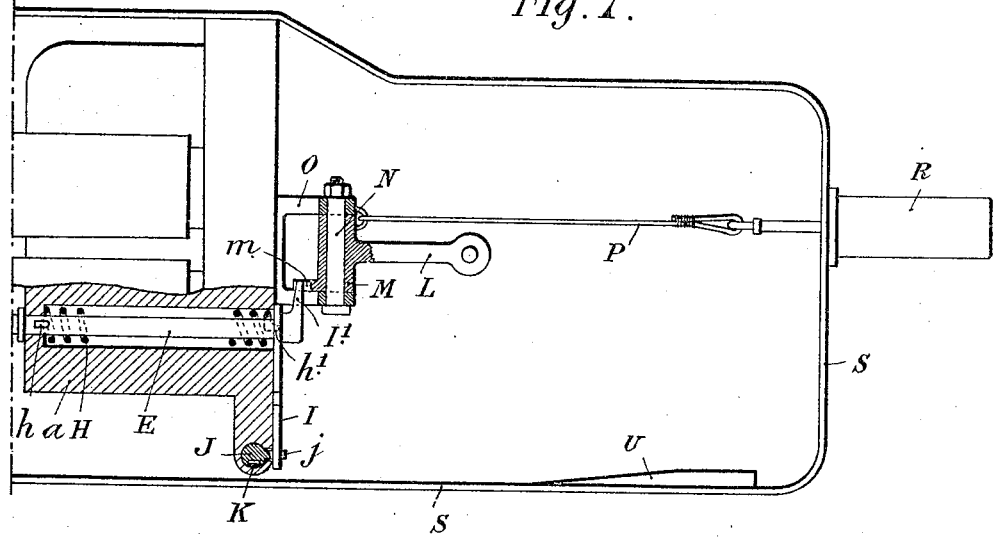

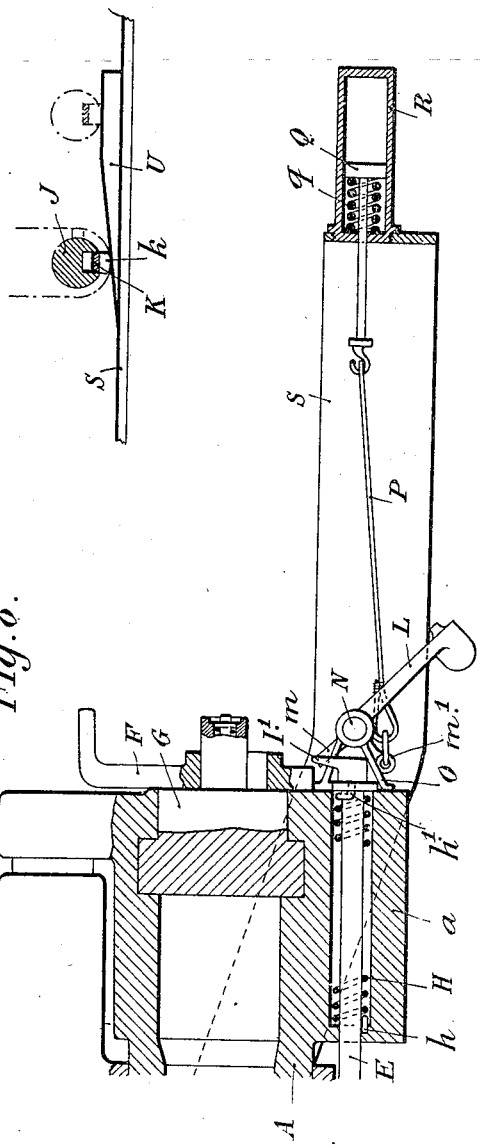

E. SCHNEIDER.
APPARATUS FOR PREVENTING THE ENTRANCE OF ENEMY PROJECTILES INTO THE MUZZLES
OF GUNS DURING THE LOADING OPERATIONS.
APPLICATION FILED JUNE 24, 1919.
1,334,801.
Patented Mar. 23, 1920.
5 SHEETS—SHEET 5.
Fig. 10.
Fig. 12.
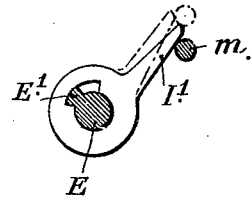
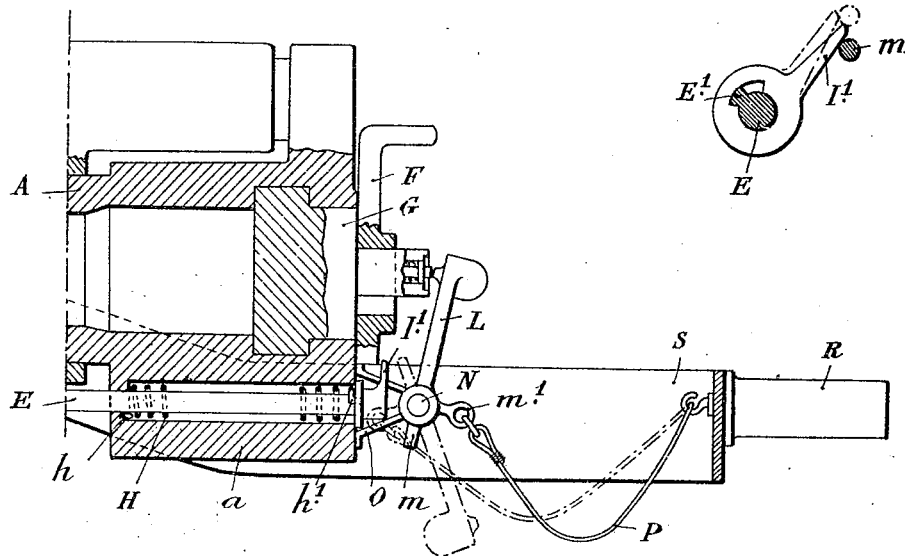
Fig. 9.
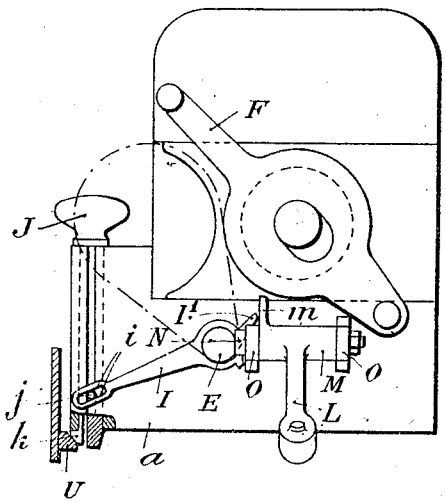

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR PREVENTING THE ENTRANCE OF ENEMY PROJECTILES INTO THE MUZZLES OF GUNS DURING THE LOADING OPERATIONS.

1,334,801.  Specification of Letters Patent.  Patented Mar. 23, 1920.

Application filed June 24, 1919. Serial No. 306,316.

*To all whom it may concern:*

Be it known that I, EUGÈNE SCHNEIDER, a citizen of the Republic of France, residing at 42 Rue d'Anjou, Paris, France, have invented a new and useful Apparatus for Preventing the Entrance of Enemy Projectiles Into the Muzzles of Guns During the Loading Operations, which invention is fully set forth in the following specification.

This invention has for its object to provide an apparatus more particularly applicable to guns carried by "tanks," which is designed to prevent the entrance of the enemy projectiles into the muzzles of guns during the loading operations.

This apparatus consists essentially of a shutter supported in front of the muzzle of the gun and connected by suitable gear to the breech block or any other movable mechanism or part of the gun in such a manner as to be caused to cover up the muzzle of the gun so long as the said movable part or mechanism is in the position of rest, and to be moved out of the way as a result of the actuation of the same mechanism, when firing the gun. The said shutter may for instance be connected to the breech block, in which case it is caused to cover up the muzzle of the gun as a result of the opening movement of the breech, and to move out of the way as a result of the movement for closing the breech.

The gear connecting the shutter and the breech block may of course vary according to the type of breech mechanism employed.

Figures 1 to 4 of the accompanying drawings illustrate by way of example the application of this invention to a gun provided with a wedge breech block.

In this example, the gun barrel A is provided close to the muzzle or on the muzzle itself, with a support such as a ring B for a shutter C of suitable thickness. The shutter, the shape of which is clearly shown in the figure, consists of a disk from which projects laterally a journal D for which the ring B serves as a bearing. In a square or polygonal recess in this journal D there is engaged a correspondingly shaped end $e$ of a shaft E, the other end of which is journaled in the breech part $a$ containing the breech block. The other end $e^1$ of the shaft E serves to receive a square tenon $f$ formed on the lever F for operating the wedge breech block G.

Figure 1:
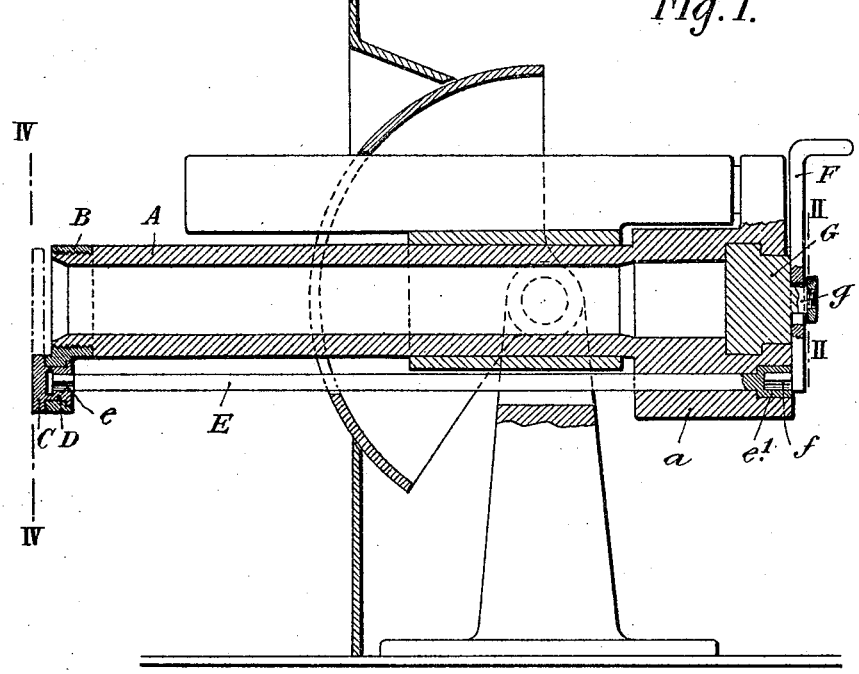
Fig. 1 is a longitudinal vertical section on the line I—I of Fig. 2.
Figure 2:
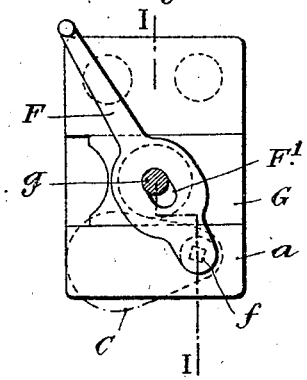
Fig. 2 is an end view partly in section on the line II—II of Fig. 1.
Figure 3:
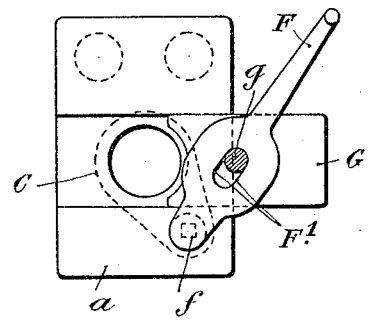
Fig. 3 is a view similar to Fig. 2 showing the parts in the position they occupy when the breech is open.
Figure 4:
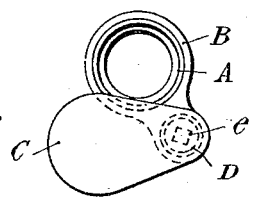
Fig. 4 is an end elevation on the line IV—IV of Fig. 1.

The lever F comprises in the known manner a slot $F^1$ in which works a stud $g$ of the breech block G. The shutter C is fixed on the end of the shaft $e$ in such an angular position that the shutter will be moved out of the way when the breech is closed (Figs. 1, 2 and 4), whereas on the contrary the movement for opening the breech due to the operation of the lever F, moves the shutter C automatically into its covering-up position (Fig. 3).

It will be readily understood that an operative connection between the shutter C and the breech block G can be easily effected by means of gears other than the gear shown in the drawings. The shutter C, instead of being journaled on the muzzle of the gun, may be hinged to the latter in such a manner as to move like a flap.

In the case where the breech block is of the screw type and is arranged to open by a rotational movement around an axis, the connecting gear between the flap-like shutter and the screw breech block can be readily effected by means of a connecting rod and cranks.

The shutter instead of being outside the muzzle of the gun, may be guided at the end of the gun barrel in a recess formed for this purpose, and the weight of the shutter may be utilized for the purpose of counterbalancing to a certain extent the force that is necessary for opening and closing the breech.

Figs. 5 to 12 illustrate a constructional example of the invention in which the shutter is connected by gear to the firing mechanism.

Figure 5:
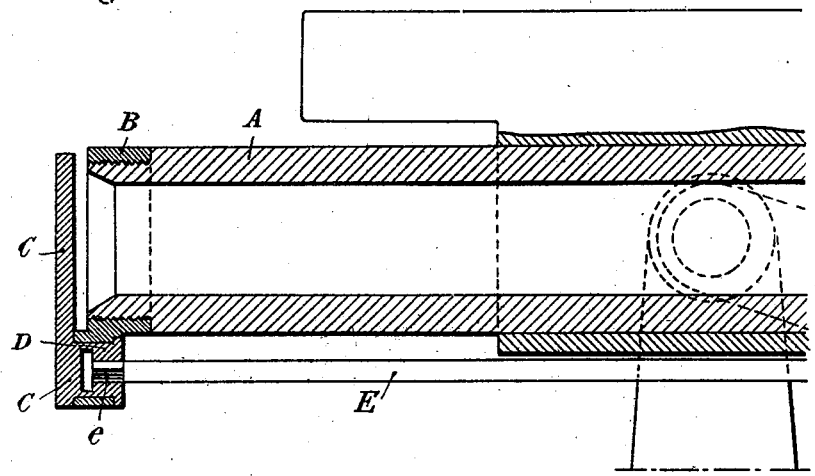
Figure 6:
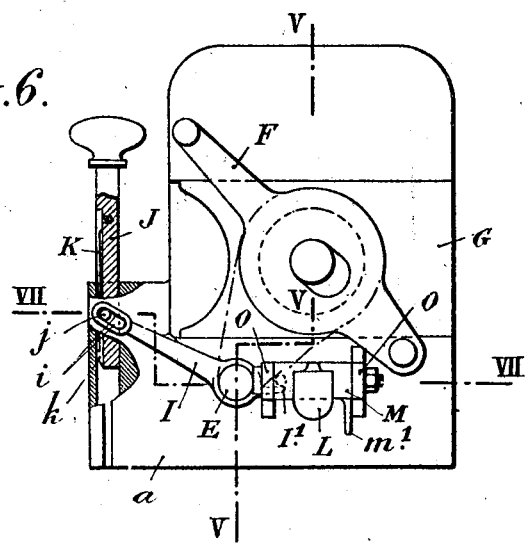

Fig. 5 is a longitudinal section on the line V—V of Fig. 6, showing the muzzle end parts of the gun in the firing position of the gun barrel, the shutter being closed.

Fig. 5ᵃ shows the breech end parts.

Fig. 6 is an end elevation viewed from the breech end, certain parts of the firing mechanism being shown in section.

Fig. 7 is a partial horizontal section on the line VII—VII of Fig. 6.

Fig. 8 is a partial vertical longitudinal section similar to Fig. 5, illustrating an intermediate position of the parts of the firing mechanism during the operation of the latter.

Fig. 9 is a corresponding rear end elevation.

Fig. 10 is a partial vertical longitudinal section similar to Fig. 8, showing the parts of the firing mechanism in the position they occupy during the recoil of the gun barrel.

Fig. 11 is a plan of a detail.

Fig. 12 illustrates on a larger scale a detail of one of the connections between the shutter and the firing mechanism.

As in the preceding example, the gun barrel A is provided in the vicinity of the muzzle or on the muzzle itself with a ring B for supporting the shutter C. This shutter is provided with a journal D, mounted in a square recess of which is fitted the end $e$ of a shaft E, the other end of which is journaled in the breech part $a$ carrying the breech block.

A torsion spring H is wound around the shaft E and fixed at one end $h$ to the breech part $a$, its other end $h^1$ being fixed to the shaft E. This spring has a constant tendency to cause the shaft E to turn in such a manner as to move the shutter C into its covering-up position. On the shaft E there is fixed an arm I whose free end is formed with a slot $i$ in which is engaged a stud $j$ projecting from a pusher J movable in a guide formed in the breech part $a$.

In a groove in the cylindrical pusher J there is arranged a flexible spring catch-hook K, the nose $k$ of which is arranged to engage with the underside of the breech part $a$ when the pusher J has arrived at the end of its stroke for the purpose of actuating the firing mechanism.

The hub of the arm I has a laterally projecting finger $I^1$ against which abuts in the rest position a tappet $m$ projecting from the hub M of the firing hammer L. This hammer L—M is mounted on an axle N journaled in a bracket O fixed to the breech part $a$. The hub of the hammer L carries an eye-piece $m^1$ for the attachment of one end of a cord P that is attached at its other end to the rod of a piston Q working in a box R carried by the guard S. A spring $q$ has a constant tendency to force the piston Q to the rear and therefore to raise the hammer L. This raising movement is prevented in the rest position by the tappet $m$ bearing against the finger $I^1$.

In the rest position the parts occupy the positions shown in Figs. 5 to 7.

To fire the gun, the pusher J is depressed until the nose $k$ of the spring catch-hook K has become engaged with the underside of the breech part $a$ (Fig. 9). In this movement the pusher moves the arm I along with it by means of the stud $j$. The finger $I^1$ of this arm carries the tappet $m$ along with it and finally releases it (Fig. 8) after having caused the depression of the hammer L and the compression of the spring $q$.

The depression of the pusher J causes the shaft E to rotate so as to move the shutter C out of the way. At the moment when the tappet $m$ is released, the spring $q$ expands and the hammer L can then strike the striker.

Immediately the gun is fired, the gun barrel recoils relatively to the stationary portion S.

Toward the end of the recoil the nose $k$ of the engaging spring catch-hook K encounters, as shown in Fig. 11, a ramp U projecting from the guard S. This allows the torsion spring H to return the shaft E into its initial position and to move the shutter C into its covering-up position. At the same time the arm I is returned into the position it occupies in Fig. 6.

At the end of the recoil, the cord P having become slack, the hammer L falls by its own weight into the position indicated in dot and dash lines. In this movement the tappet $m$ passes in front of the finger $I^1$ which it raises. Since the hub of the arm I is mounted with a certain amount of "play" on a rib or key $E^1$ on the shaft E, as shown in Fig. 12, then when the gun barrel has run out again into firing position, as soon as the cord P has been drawn tight, the tappet $m$ which has moved above the finger $I^1$, moves the latter into its position of rest (Figs. 5 to 7).

What I claim is:—

1. In apparatus for preventing enemy shells entering the muzzle of a gun, the combination of a gun, a movable shutter mounted on the muzzle thereof, a spring operated firing hammer pivotally mounted on the breech of the gun, a shutter operating rod revoluble under torsional spring pressure for normally closing said shutter, manually operated means having a part normally in the path of said hammer for holding the same out of firing position and adapted to rock said rod against said spring tension to open said shutter and release said hammer for firing, locking means for said manually operated means operating during firing and adapted to be released by movement of the gun on recoil to restore the parts to initial position of rest.

2. In apparatus for preventing enemy shells entering the muzzle of a gun, the combination of a gun, a movable shutter mounted on the muzzle thereof, a spring operated firing hammer pivotally mounted on the breech of the gun, a shutter operating rod revoluble under torsional spring pressure for normally closing said shutter, an arm mounted on said rod, a finger member having a lost motion engagement with said rod and normally in the path of said hammer for holding the latter out of firing position, a manually operated push rod having a loose connection with said arm for rocking said shutter rod against said spring tension to open the shutter and release said firing hammer, said push rod being provided with means for locking the same in depressed position during firing and release means therefor operated on recoil of the gun for restoring the parts to their initial position of rest.

3. In apparatus for preventing enemy shells entering the muzzle of a gun, the combination of a gun, a movable shutter mounted on the muzzle thereof, a normally spring pressed firing hammer pivotally mounted on the breech of the gun and adapted to fall by gravity out of firing position on recoil of the gun, a shutter operating rod revoluble under torsional spring pressure for normally closing said shutter, a finger member having a lost motion engagement with said shutter operating rod for restraining said hammer from moving into firing position, and permitting the hammer to fall after firing, manually operated means adapted to rock said rod against said spring tension to open said shutter and release said hammer for firing, locking means for said first named means operating during firing, and means operated on recoil of the gun for releasing said locking means for restoring the parts to their initial position of rest.

In testimony whereof I have signed this specification.

EUGÈNE SCHNEIDER.

Witnesses:
ANDRÉ MOSTICKER,
CHAS. P. PRESSLY.